United States Patent [19]

Manoogian et al.

[11] 4,212,012
[45] Jul. 8, 1980

[54] CONTINUOUS WAVE RADAR

[75] Inventors: David V. Manoogian, Lynnfield; Roderic J. Procaccino, Westwood, both of Mass.

[73] Assignee: Raytheon Company, Lexington, Mass.

[21] Appl. No.: 970,600

[22] Filed: Dec. 18, 1978

[51] Int. Cl.² ............................................. G01S 9/37
[52] U.S. Cl. .................................. 343/7 A; 343/17.5
[58] Field of Search .......................... 343/7 A, 17.5

[56] References Cited

U.S. PATENT DOCUMENTS

| 3,611,369 | 10/1971 | Maguire | 343/7 A |
| 4,012,737 | 3/1977 | Waer et al. | 343/17.5 |
| 4,064,511 | 12/1977 | Manfanovsky | 343/7 A |
| 4,067,012 | 1/1978 | Platt et al. | 343/7 A |
| 4,132,990 | 1/1979 | DiDomizio et al. | 343/7 A |

Primary Examiner—T. H. Tubbesing
Attorney, Agent, or Firm—Philip J. McFarland; Joseph D. Pannone

[57] ABSTRACT

A technique is described whereby a continuous wave radar transmitting a carrier with wide band modulation may be arranged adaptively to null large clutter returns from clutter at any range or azimuth.

1 Claim, 1 Drawing Figure

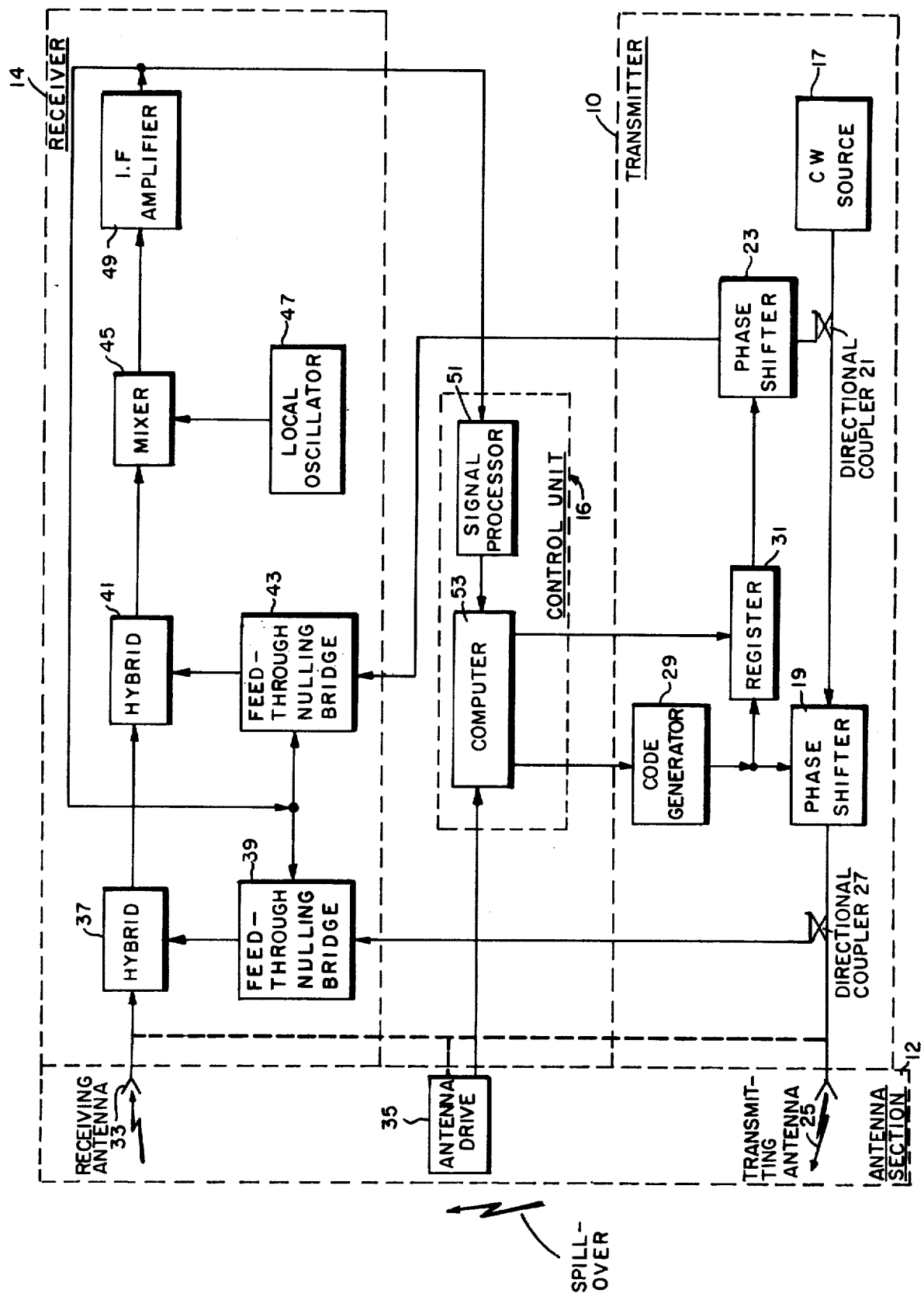

CONTINUOUS WAVE RADAR

BACKGROUND OF THE INVENTION

This invention pertains generally to continuous wave radar (CW radar) and particularly to radar of such type wherein ranging information may be derived.

It is well known in the art to modulate the transmitted signal from a CW radar so that the range of any detected target may be determined. Thus, it is common practice to modulate a continuous wave carrier signal with a frequency-modulated, or phase-modulated, wave and then, by correlating the echo signal received at any instant in time with a portion of the transmitted signal then being transmitted, producing a signal whose frequency, or phase, is a function of the range of the target.

It is also well known that continuous wave radars suffer from spillover, i.e. direct transmission of energy from the transmitting antenna to the receiving antenna, and from large clutter returns due to reflection from nearby objects. When the bandwidth of the transmitted signal is narrow, known "feedthrough nulling" techniques may be employed to reduce the effects of spillover and such clutter returns. When, however, the bandwidth of the transmitted signal is wide, i.e. when the continuous wave carrier is modulated with a wide band modulation signal to improve range resolution, conventional feedthrough nulling techniques are ineffective because the spectrum of clutter returns may be increased to overlap the spectrum of Doppler frequencies of echo signals from targets desired to be tracked. Obviously, then, in view of the disparity between the levels of clutter returns and echo signals, detection of the latter is most difficult, if not impossible.

SUMMARY OF THE INVENTION

In view of the background of the invention, it is a primary object of this invention to provide an improved CW radar wherein wideband modulation of a carrier is utilized to increase ranging capability.

The foregoing object is generally attained by employing at least two nulling loops in the receiver of a CW radar, the first such loop being arranged to null spillover and the second such loop being arranged to null the worst clutter signals from clutter at preselected ranges at each azimuth. To accomplish the latter, the time delay in the reference path of the second nulling loop is controlled to equal the propagation delay of transmitted signals to the clutter to be nulled at each azimuth.

BRIEF DESCRIPTION OF THE DRAWINGS

For a more complete understanding of this invention, reference is now made to the following description of the preferred embodiment of this invention as illustrated in the accompanying drawing, the single FIGURE of which is a simplified block diagram of a contemplated CW radar.

DESCRIPTION OF THE PREFERRED EMBODIMENT

Referring now to the figure it may be seen that the contemplated CW radar (using, for example, a pseudo-random phase modulation technique for ranging) is made up of four interconnected major subassemblies: A transmitter 10; an antenna section 12; a receiver 14; and a control unit 16.

The transmitter 10 is made up of a CW source 17 (of conventional construction) which produces a CW carrier with sufficient power to allow targets (not shown) to be detected. The CW carrier is passed, through an appropriate transmission path (not numbered) to a phase shifter 19. A directional coupler 21 is disposed, as shown, to allow a small portion of the CW carrier to be fed to a phase shifter 23.

Phase shifters 19, 23 here are digital phase shifters adapted to pass the CW carrier without change in phase or to pass the CW carrier with a 180° shift in phase.

The output of the phase shifter 19 is connected, through an appropriate transmission line (not numbered)) to a transmitting antenna 25. A directional coupler 27 is disposed, as indicated, to tap off a small portion of the output signal of the phase shifter 19. Control signals for the phase shifter 19 are derived directly as shown from a code generator 29. Similar control signals for the phase shifter 23 are derived through a register 31.

The code generator 29 here may be a simple switching arrangement for producing bipolar DC signals in accordance with control signals (repetitive pseudo-random trains of pulses) from the control unit 16. It will be appreciated, therefore, that the output signal from the phase shifter 19 is the continuous wave carrier phase modulated in accordance with a pseudo-random code.

The antenna section 12 includes, in addition to the transmitting antenna 25, a receiving antenna 33 and an antenna drive 35. The latter, of course, is arranged to rotate the transmitting antenna 25 and the receiving antenna 31 in unison.

The receiving antenna 33 is connected to a first input port (not numbered) of a hybrid junction 37 and a feedthrough nulling bridge 39 is connected to a second input port (not shown) of the hybrid junction 37. The first and second input ports are those ports which cause the difference between signals to be produced. The output of the hybrid junction 37 is fed to a first input port of a hybrid junction 41. The output of a feedthrough nulling bridge 43 is connected to a second input port of the hybrid junction 41. As with the hybrid junction 37, the difference between the input signals to the hybrid junction 41 is produced at the output port. Such difference is connected to a mixer 45 along with a signal from local oscillator 47. The resulting intermediate frequency signal is passed through an amplifier (I.F. amplifier 49) and then divided, with a first part being fed back to the feedthrough nulling bridges 39, 43 and a second port being connected to a signal processor 51 in the control unit 16. Finally, a computer 53 is responsive, as shown, to the output of the signal processor 51 and to azimuth position data from the antenna drive 35 to produce the control signals for the code generator 29 and control signals for the register 31.

The feedthrough nulling bridges 39, 43 may be similar to those shown on pages 16–19 of the *RADAR HANDBOOK* by Merrill I. Skolnik, Copyright 1970 by McGraw-Hill, Inc.. The signal processor 51 may be of the type shown in U.S. Pat. No. 3,875,391 to Shapiro which is assigned to the same assignee as the present invention.

In operation, the antenna drive 35 is actuated in any convenient manner to step the transmitting antenna 25 and the receiving antenna 33 through its complete azimuth scan. Each step may be in order of a beamwidth to permit nulling to be accomplished as much as possible. Spillover and close-in clutter returns (which are practically contemporaneous and are referred to hereinafter as "near-field signals") are automatically nulled by reason of the operation of the feedthrough nulling bridge. High clutter returns from objects at a distance (referred to hereinafter as "far-field signals"), for example returns from man-made objects such as standpipes or natural objects such as mountains, are not nulled by operation of the feedthrough nulling bridge 39 because correlation between the inputs to the hybrid junction 37 is not achieved. With the control signal from the computer 53 to the register 31 first being set to be contemporaneous with the control signal to the code generator 29, the feedthrough nulling bridge 43 and then delayed (without changing the azimuth of the antenna section 12) to correspond with ranges up to the ambiguous range, correlation between the output of the feedthrough nulling bridge 43 and return signals from clutter at different ranges will occur. Each time correlation occurs, the hybrid junction 41 is effective to null the return from clutter at a given range. The output of the signal processor 51 then reflects each such nulling. The range from which the largest clutter signal is received is then stored in the computer 53, along with the azimuth of the antenna section 12. Thus, after completion of the observations throughout all of the azimuth steps, the computer 53 is programmed automatically to delay the control signal to the register 31 so that when the antenna section 12 is continuously rotated, nulling of the highest clutter signal at any azimuth is effected.

Having described a preferred embodiment of this invention, it will now be apparent to one of skill in the art that changes may be made without departing from our inventive concepts. For example, the number of nulling loops may be increased so that clutter returns from clutter at different ranges at the same azimuth may be nulled. Additionally, the type of modulation of the carrier may be changed. It is felt, therefore, that this invention should not be restricted to its disclosed embodiment, but rather should be limited only by the spirit and scope of the appended claims.

What is claimed is:

1. The method of operating a continuous wave radar which transmits a modulated continuous wave signal in a directional beam from a transmitting antenna trainable in azimuth and receives clutter signals from clutter at different ranges as the azimuth is changed, such method comprising the steps of:
   (a) determining, at each position in azimuth of the transmitting antenna, the range of any clutter in the far-field and storing a timing signal representative of the propagation delay of the clutter causing the greatest far field signal;
   (b) storing a reference signal representative of the modulation of the transmitted signal; and
   (c) reproducing, in response to the timing signal for each position in azimuth, the reference signal and nulling the then received clutter signals.

* * * * *